(12) United States Patent
Liu et al.

(10) Patent No.: US 7,450,609 B2
(45) Date of Patent: Nov. 11, 2008

(54) METHOD AND APPARATUS FOR STATISTICALLY MULTIPLEXING MULTIPLE GROUPS OF SERVICES

(75) Inventors: Vincent Liu, San Diego, CA (US);
Siu-Wai Wu, San Diego, CA (US); Ly Tran, San Diego, CA (US); Craig Cuttner, Norwalk, CT (US)

(73) Assignee: General Instruments Corporation, Horsham, PA (US)

( * ) Notice: Subject to any disclaimer, the term of this patent is extended or adjusted under 35 U.S.C. 154(b) by 825 days.

(21) Appl. No.: 10/265,080

(22) Filed: Oct. 4, 2002

(65) Prior Publication Data
US 2003/0081631 A1 May 1, 2003

Related U.S. Application Data

(60) Provisional application No. 60/327,539, filed on Oct. 5, 2001.

(51) Int. Cl.
*H04J 3/16* (2006.01)
*H04J 3/18* (2006.01)

(52) U.S. Cl. .................................. 370/468; 370/477

(58) Field of Classification Search ................. 370/468, 370/477, 329, 341, 395.41, 465
See application file for complete search history.

(56) References Cited

U.S. PATENT DOCUMENTS 6,665,872 B1 * 12/2003 Krishnamurthy et al. ...... 725/95
6,909,726 B1 * 6/2005 Sheeran ..................... 370/468
2004/0255042 A1 * 12/2004 Megeid ....................... 709/231

* cited by examiner

*Primary Examiner*—Edan Orgad
*Assistant Examiner*—Blanche Wong
(74) *Attorney, Agent, or Firm*—Larry T. Cullen

(57) ABSTRACT

Methods and apparatus are provided for allocating bandwidth among members of two statistical multiplexing groups having overlapping members. At least two groups of such services having overlapping members are defined. The members of a first one of the groups consume a first bandwidth and the members of a second one of the groups consume a second bandwidth. A total bandwidth of all the members of the groups together is restricted to be no more than a total available bandwidth. In order to accomplish this, the members of the first and second groups are statistically multiplexed based on bandwidth requirements of members common to both said first and second groups.

4 Claims, 6 Drawing Sheets

METHOD AND APPARATUS FOR STATISTICALLY MULTIPLEXING MULTIPLE GROUPS OF SERVICES

The present application claims the benefit of U.S. provisional patent application No. 60/327,539 filed on Oct. 5, 2001.

BACKGROUND OF THE INVENTION

The present invention relates to broadband communications, and more particularly to methods and apparatus for statistically multiplexing a plurality of services, such as cable or satellite television services, into a combined data stream for transmission to a population of subscriber terminals.

In a typical broadband network, such as a cable television system, satellite television system, subscription network service or the like, subscribers are provided with a broadband communications terminal. A broadband communications terminal contains the electronic equipment that is used, e.g., to connect the subscriber's television, computer and/or other consumer electronic equipment with the broadband network. In the case of a cable or satellite television system, the broadband communications terminal is typically connected to the network through a co-axial wall outlet. Other network connection techniques, such as the use of various standard computer connectors (e.g., universal serial bus "USB" connectors and "Category 5" couplers) are well known in the art.

In the subscription television field, a present day broadband communications terminal is essentially a computer programmed to process the signals from the television network (e.g., cable or satellite) to provide the subscriber with, e.g., cable services. As used hereinafter, the term "cable services" is not intended to be limited to television services received over a cable distribution plant, but can also describe other network services including Internet and data services, which may be delivered over any type of broadband network, including satellite television systems.

Cable services are controlled, e.g., by a cable television company and typically include a number of basic television channels, premium channels which may be provided to subscribers at an additional fee, and pay-per-view events. The broadband communications terminal is programmed to provide these services to the subscriber.

However, the services of the cable company need not be limited to providing television programming. Some cable companies are now offering Internet access and e-mail over the cable network at speeds much faster than are available over conventional telephone lines. It is anticipated in the future that more and more services will be commonly provided over such broadband networks, including video on demand and even basic telephone service. Eventually, each home or office may have a single connection, via the cable network, to all electronic data services. The cable network is also expected to evolve from coaxial cable service to optical fiber service. Currently, optical fiber distribution is in fairly widespread use, except on the "cable drop" to the home. Eventually, fiber is expected to be used in the cable drop, and potentially inside the home itself. The provision of a wholly fiber distribution path is expected to increase the system bandwidth, enabling more services to be provided.

Current broadband networks are limited by the amount of bandwidth they provide, which determines the amount of raw data, and hence the number of services (such as television channels, including movie channels, pay-per-view channels and Internet access) they can carry. One technique for maximizing the data carrying capability of a broadband network is to individually statistically multiplex the services carried over the network. With statistical multiplexing, more bandwidth is provided to services when they need it, and less when they do not. Thus, over time, the bandwidth requirements of all of the services carried is averaged to maintain the total consumed bandwidth within the capabilities of the broadband network. Various statistical multiplexing techniques are well known, as evidenced, for example, in U.S. Pat. No. 5,216,503 to W. Paik, et al. entitled "Statistical Multiplexer for A Multi Channel Image Compression System" and U.S. Pat. No. 6,167,084 to L. Wang et al. entitled "Dynamic Bit Allocation for Statistical Multiplexing of Compressed and Uncompressed Digital Video Signals", A satellite transponder, for most communication link budget scenarios, provides transmission capacity in excess of a six MHz cable television channel. Various configurations, such as the split multiplex mode and the recently introduced "Megapipe" configuration (promoted by the Home Box Office (HBO®) television network for a high bandwidth data pipe) permit a subscription television multiple system operator (MSO) to select a subset of satellite feeds to map onto a cable television plant. Devices exist to facilitate this selection/repackaging at the cable television headend at various costs and complexities. Many of these techniques, such as Megapipe, use fixed bit-rate (constant bit rate—CBR) groups of services for predetermined configurations.

As an example of a satellite configuration, a satellite/cable television service programmer may have "East" and "West" time zone feeds. While some MSOs may take both East and West in a given system, capacity-constrained systems may only be able to use the time zone feed specific to their region. Since the satellite capacity may permit carriage of both East and West simultaneously, perhaps along with "non-time-specific feeds", there still needs to be a method to compress the East, West and non-time-zone feeds while respecting the MSOs ability to select the feed groupings for a given system data rate. The system data rate is typically set by the modulation format used, for example, Quadrature Amplitude Modulation (QAM). Currently, the communication of such feeds is provided using groups of CBR channels. Unfortunately, the CBR groups eliminate some of the compression efficiencies that are obtained by using statistical multiplexing in the encoder.

It would be advantageous to provide a statistical multiplexing method and apparatus for maintaining compression efficiency among different groupings of service feeds, in a manner that allows MSOs to select particular feed groupings. It would be still further advantageous if both overlapping and non-overlapping groups could be accommodated. The present invention provides a multi-group statistical multiplexer and methods having the aforementioned and other advantages.

SUMMARY OF THE INVENTION

In accordance with one embodiment of the invention, methods and apparatus are provided for allocating bandwidth among members of at least two statistical multiplexing groups having overlapping members. A first group of services is defined having a first bandwidth requirement BW_1. A second group of services is defined having a second bandwidth requirement BW_2. Services common to both said first and second groups are identified. The first group of services exclusive of the common services comprises a subgroup A to be allocated a bandwidth BW_A. The common services comprise a subgroup B to be allocated a bandwidth BW_B. The second group of services exclusive of the common services comprises a subgroup C to be allocated a bandwidth BW_C. The bandwidth BW_B is allocated. Subsequently, the bandwidths BW_A and BW_C are derived in accordance with the allocated bandwidth BW_B.

In an example implementation the bandwidth BW_B is allocated by averaging the values:

BW__1*need-parameter(B)/need-parameter(A+B),

BW__2*need-parameter(B)/need-parameter(B+C),

BW_Total*need-parameter(B)/need-parameter(A+B+C);

where (i) BW_Total is the total bandwidth available for allocation, (ii) need-parameter (x) is the total bandwidth requirement of x, and (iii) BW_B is bounded by a minimum of (BW__1+BW__2−BW_Total).

The bandwidths BW_A and BW_C can be derived from the relationships:

$$BW\_A + BW\_B = BW\_1,$$

$$BW\_B + BW\_C = BW\_2, \text{ and}$$

$$BW\_A + BW\_B + BW\_C \leq BW\_Total.$$

In a more general form of the invention, methods and apparatus are provided for statistically multiplexing a plurality of digital information services. At least two groups of such services having overlapping members are defined. Overlapping members is intended to mean that there are members (e.g., services, such as HBO®, the Movie Channel®, ESPN®, etc.) common to both groups, even though the groups will also have unique members that are not members of the other group(s). The members of a first one of the groups will consume a first bandwidth BW__1 and the members of a second one of the groups will consume a second bandwidth BW__2. A combined bandwidth of all the members of the groups together is restricted to be no more than a total bandwidth BW_Total. In accordance with the invention, the members of the first and second groups are statistically multiplexed based, at least in part, on bandwidth requirements of members common to both the first and second groups.

In another embodiment, a hierarchical scheme is used to allocate bandwidth among members in the statistical multiplexing process where services are partitioned into groups with non-overlapping membership.

DETAILED DESCRIPTION OF THE INVENTION

According to the present invention, an algorithm is provided to efficiently allocate bandwidth among members of at least two statistical multiplexing groups with overlapping membership. As will be appreciated by those skilled in the art, such an algorithm can be provided in software, hardware, firmware, or any combination thereof. The invention can be implemented, for example, within a quantization level processor of a multichannel encoder that utilizes a statistical multiplexer to maintain the total data throughput of a plurality of service streams within an available bandwidth. Such a statistical multiplexer is disclosed in commonly assigned, co-pending U.S. patent application Ser. Nos. 09/665,373 and 09/666,901, both filed on Sep. 20, 2000 and incorporated herein by reference. In the '373 application, a statistical multiplexer is provided for coding and multiplexing multiple channels of digital television data (i.e., "source video"). A bit rate need parameter is determined for each encoder in a statistical multiplexer group by scaling the complexities of previous pictures of the same and different picture types. Scaling factors based on an activity level, motion estimation score, and number of pictures of a certain type in a Group of Pictures (GOP), may be used. Moreover, the scaling factors may be bounded based on a linear or non-linear operator to prevent large variations in the factors. An encoding bit rate is allocated to each channel based on its need parameter. The need parameter indicates how difficult it is to compress a particular channel to which the need parameter relates. More particularly, the visual characteristics and complexity information regarding the source video are collected and condensed into a single parameter, which is referred to as the "need parameter". A need parameter is calculated for each video channel, and is updated once per frame whenever a new video frame is processed. Optionally, the need parameter can be updated more often, such as multiple times per frame. Moreover, for field-picture mode, the need parameter can be updated once per field.

Figure 1:
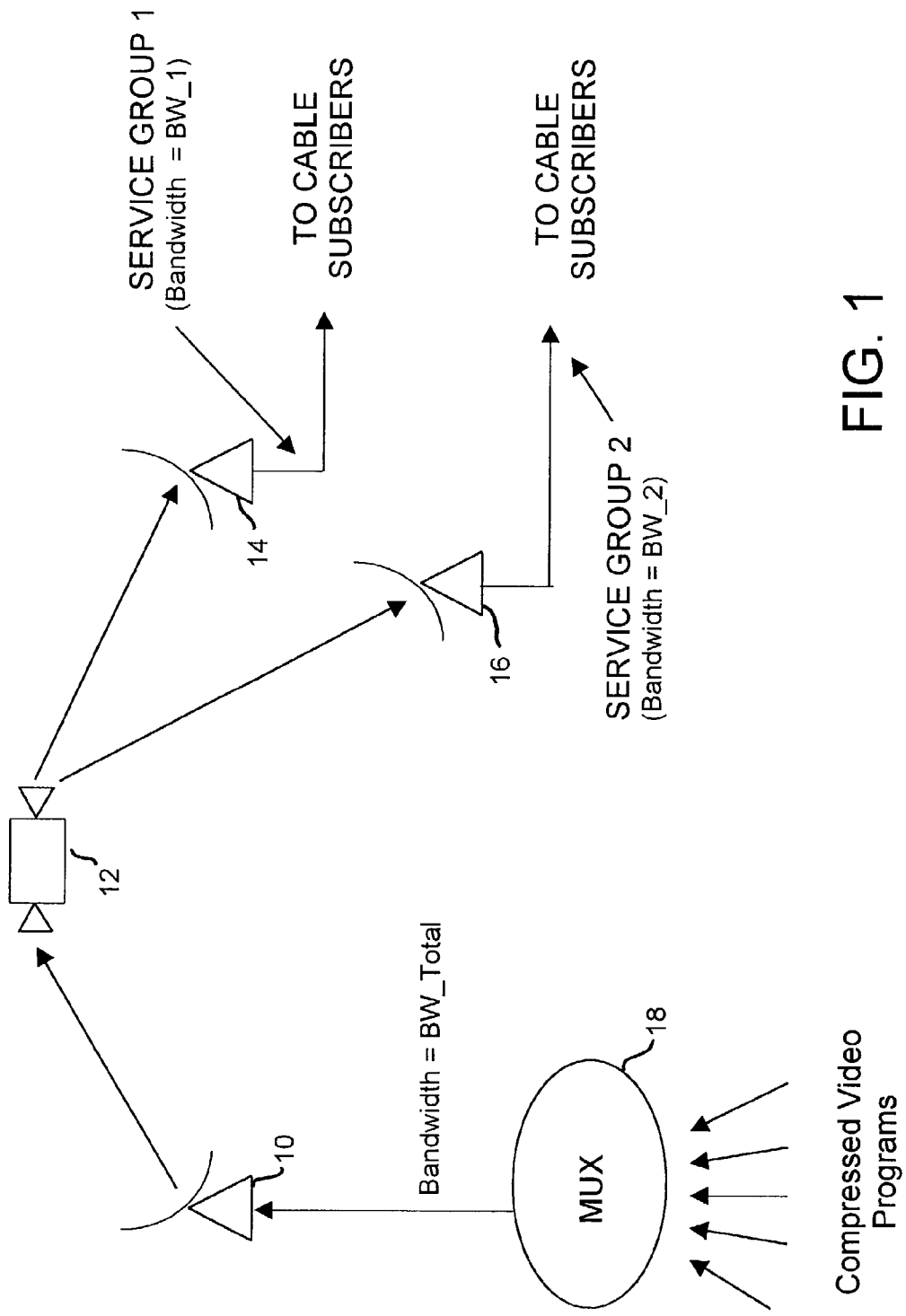
FIG. 1 is a block diagram of a broadband network, including a satellite uplink and a plurality of headend receivers and multiplexer.

Referring to FIG. 1, which is an example implementation of the invention in a satellite/cable television environment, a satellite uplink 10 receives a plurality of services (e.g., compressed video programs) via a multiplexer 18 for transmission to a satellite 12. As shown, the plurality of services provided as output from multiplexer 18 occupy a total bandwidth BW_Total.

As will be appreciated by those skilled in the art, any number of satellite uplinks may communicate with satellite 12, each providing one or more services for subsequent downloading and distribution to one or more populations of subscriber terminals, such as set-top boxes. In the simplified implementation illustrated in FIG. 1, the satellite 12 downloads multiple services to a plurality of satellite receivers, such as receivers 14 and 16 which may be located at one or more cable television headends. It is noted that multiple uplink satellite transmitters, multiple satellites, and multiple satellite receivers will be used in a conventional system to provide different services for distribution to subscribers. Such services can comprise, for example, premium television channels such as HBO®, Cinemax®, The Movie Channel®, various pay-per-view events, Internet services, and the like. In the example of FIG. 1, satellite receiver 14 receives a data stream carrying a group of services referred to as "Service Group 1" which utilizes a bandwidth BW__1. Similarly, satellite receiver 16 receives a stream carrying a group of services referred to as "Service Group 2" that utilizes a bandwidth BW__2. The satellite receivers 14, 16 provide the respective service groups as output to the ultimate users, e.g., cable television subscribers.

In a conventional statistical multiplexer, the received streams do not have overlapping services, or if they do, the fact that the services overlap is not accounted for. However, in the multi-group statistical multiplexer 18 of the present invention, the existence of overlapping services in two or more received streams is advantageously determined and accounted for.

The multi-group statistical multiplexer (stat mux) of the present invention is designed to process two or more stat mux groups with overlapping members, via software that invokes a multi-group stat mux mode described hereinafter. As noted above, the two groups, labeled Service Group 1 and Service Group 2, have bandwidths BW_1 and BW_2 respectively. In addition, the total bandwidth of all the members is restricted to be equal to or less than the total bandwidth BW_Total capable of being communicated over the communications network from the multiplexer 18 to the satellite uplink 10.

In accordance with the invention, the multi-group stat mux is set up by configuring, e.g., two stat mux groups with some members overlapped. Moreover, a third group is configured to have all the members of the two previous groups. The stat mux quantization level processor (QLP) is implemented to check the configuration and invoke a multi-group stat mux mode when such a configuration is detected.

Figure 2:
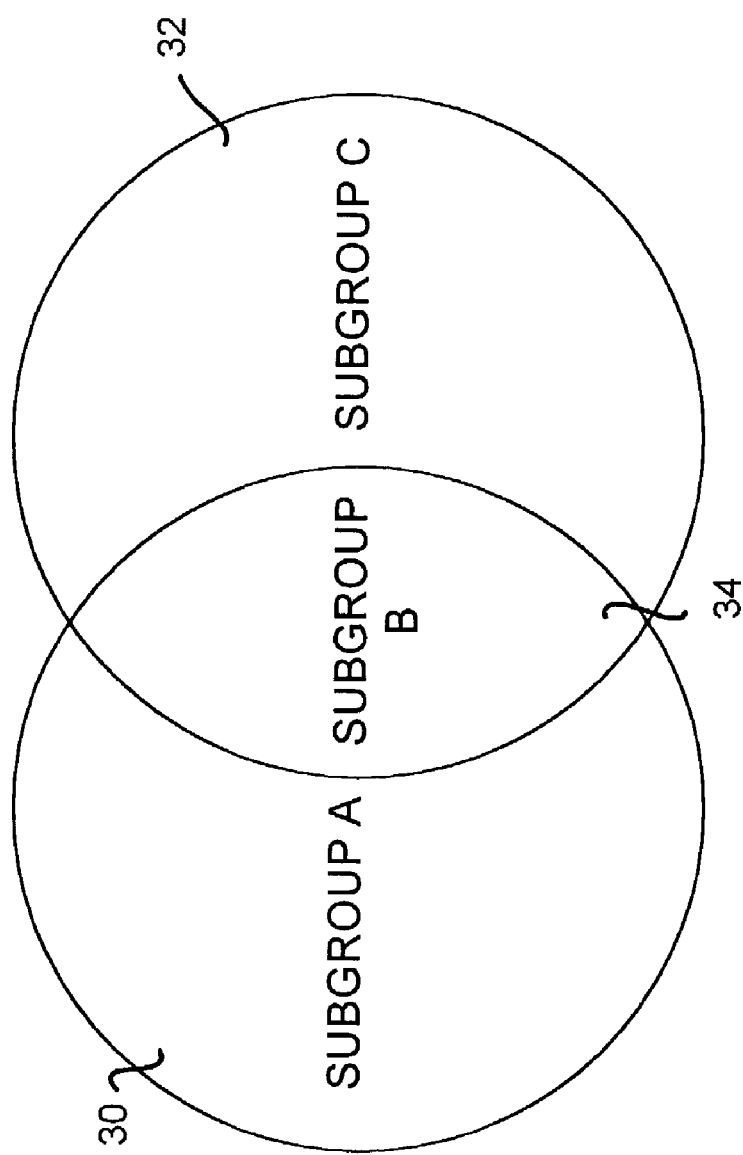
FIG. 2 illustrates the concept of multiple service groups with overlapping members in accordance with the invention.

For the following discussion, three sub-groups of services A, B and C (denoted by reference numerals 30, 34 and 32, respectively) are defined, as illustrated in FIG. 2. All the members belonging exclusively to Group 1 are assigned to sub-group A. The members that are common to Group 1 and Group 2 are assigned to sub-group B. The members belonging exclusively to Group 2 are put into sub-group C. The constraints on the sub-group bandwidths are:

$BW\_A+BW\_B=BW\_1$, $BW\_B+BW\_C=BW\_2$, and $BW\_A+BW\_B+BW\_C<=BW\_Total$.

At the beginning of each bandwidth assignment period (the bit rate (BR) period which occurs about once per millisecond), the QLP assigns a bandwidth to sub-group B by taking the average of the following three values:

BW_1*Need_parameter (B)/Need_parameter (A+B),

BW_2*Need_parameter (B)/Need_parameter (B+C), and

BW_Total*Need_parameter (B)/Need_parameter (A+B+C).

The bandwidth for B is then bounded by a min. of (BW_1+BW_2)−BW_Total. This is needed since any bandwidth assignment for B below the minimum will cause the total bandwidth to be exceeded. Once the bandwidth for B has been decided, BW_A and BW_C are derived. The QLP will then resume the regular bandwidth allocation code treating each sub-group as a separate stat mux group. The bandwidths for the sub-groups A, B and C are re-computed every BR period allowing them to adapt to the current needs of their members. It is noted that the BR period is the cycle period at which the statmux algorithm collects statistics (e.g., need parameters) from the individual members (e.g., video encoders) of the statmux group. The bandwidth is then redistributed among these members.

Figure 3:
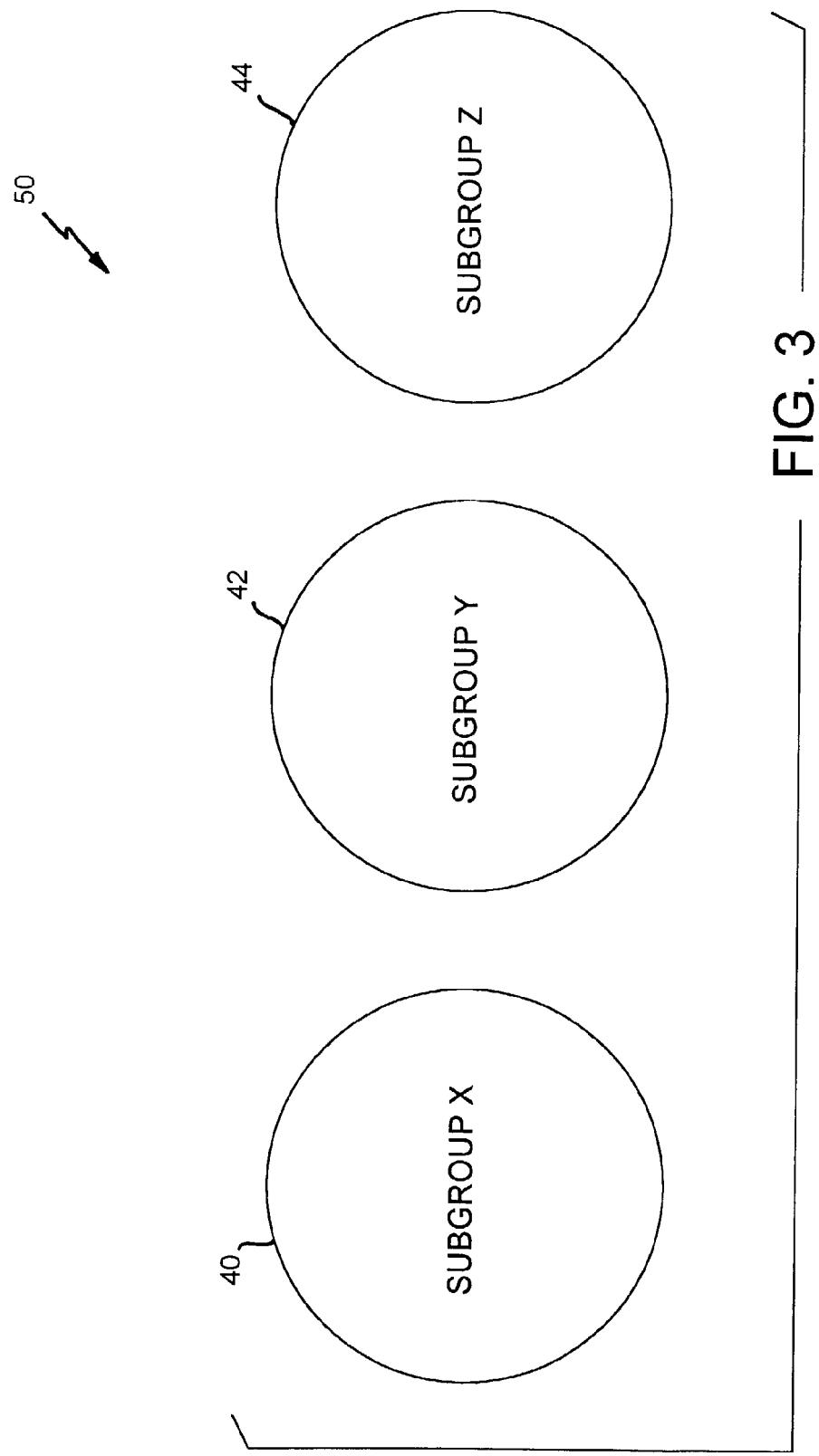
FIG. 3 illustrates the concept of multiple service groups with non-overlapping members in accordance with the invention.

In another embodiment of the invention, a heirarchical bandwidth allocation scheme is used. In particular, a large statmux group (e.g., X+Y+Z) is partitioned into non-overlapping sub-groups of services. For example, as indicated in FIG. 3, a statmux group generally designated 50 is partitioned into three different non-overlapping subgroups X, Y and Z, referred to by reference numerals 40, 42 and 44, respectively.

Once a plurality of non-overlapping subgroups is defined within an overall group of services, the total bandwidth (BW_Total) can be distributed among the subgroups, for example, among the three subgroups X, Y and Z discussed above. More particularly, bandwidth will be distributed to each individual subgroup based on the "need" and the "bandwidth constraint" of the subgroup. In the present example, subgroup X will be allocated a bandwidth BW_X, subgroup Y will be allocated a bandwidth BW_Y, and subgroup Z will be allocated a bandwidth BW_Z, where BW_X+BW_Y+BW_Z<=BW_Total. The bandwidth allocated to each subgroup will then be allocated to the members (i.e., individual service offerings) of that subgroup in accordance with any well known statmux algorithm.

It should now be appreciated that the present invention provides methods and apparatus for allocating bandwidth among members of two statistical multiplexing groups having overlapping members. At least two groups of such services having overlapping members are defined. The members of a first one of the groups consume a first bandwidth BW_1 and the members of a second one of the groups consume a second bandwidth BW_2. A total bandwidth of all the members of the groups together is restricted to be no more than a total available bandwidth BW_Total. In order to accomplish this, the members of the first and second groups are statistically multiplexed based on bandwidth requirements of members common to both said first and second groups. In an alternate hierarchical bandwidth allocation technique, non-overlapping subgroups are accommodated.

Although the invention has been described in accordance with particular embodiments thereof, it should be appreciated that various adaptations and modifications may be made thereto without departing from the scope of the invention as set forth in the following claims.

What is claimed is:

1. A method for allocating bandwidth among members of two statistical multiplexing groups having overlapping members, comprising:
    (1) identifying a first group of services having a first bandwidth requirement BW_1;
    (2) identifying a second group of services having a second bandwidth requirement BW_2;
    (3) identifying services common to both said first and second groups;
    wherein:
    said first group of services exclusive of the common services comprises a subgroup A to be allocated a bandwidth BW_A;
    said common services comprise a subgroup B to be allocated a bandwidth BW_B; and
    said second group of services exclusive of the common services comprises a subgroup C to be allocated a bandwidth BW_C;
    (4) allocating the bandwidth BW_B so said common services are provided for in the total bandwidth available for allocation; and
    (5) after step (4), deriving the bandwidths BW_A and BW_C in accordance with the allocated bandwidth BW_B,
    wherein step (4) and step (5) are performed prior to transmission of said first group of services or said second group of services to end users, and
    wherein the bandwidth BW_B is allocated by averaging the values:
    BW_1*need-parameter/need-parameterA+B,
    BW_2*need-parameterB/need-parameterB+C,
    BW_Total*need-parameterB/need-parameterA+B+C;
    where (i) BW_Total is the total bandwidth available for allocation, (ii) need-parameter (x) is the total bandwidth requirement of subgroup x, and (iii) BW_B is bounded by a minimum of BW__1+BW__2−BW_Total.

2. A method in accordance with claim 1, wherein the bandwidths BW_A and BW_C are derived from the relationships:

$$BW\_A + BW\_B = BW\_1,$$

$$BW\_B + BW\_C = BW\_2, \text{ and}$$

$$BW\_A + BW\_B + BW\_C \leq BW\_\text{Total}.$$

3. A statistical multiplexer for allocating bandwidth among members of two statistical multiplexing groups having overlapping members, comprising:
   (1) an input adapted to receive a first group of services having a first bandwidth requirement BW__1;
   (2) an input adapted to receive a second group of services having a second bandwidth requirement BW__2;
   (3) a processor adapted to identify services common to both said first and second groups;
   wherein:
      said first group of services exclusive of the common services comprises a subgroup A to be allocated a bandwidth BW_A;
      said common services comprise a subgroup B to be allocated a bandwidth BW_B; and
      said second group of services exclusive of the common services comprises a subgroup C to be allocated a bandwidth BW_C; and
   (4) a computer algorithm containing instructions for allocating the bandwidth BW_B and subsequently deriving the bandwidths BW_A and BW_C in accordance with the allocated bandwidth BW_B so said common services are provided for in the total bandwidth available for allocation,
   wherein step (4) is performed prior to transmission of said first group of services or said second group of services to end users, and
   wherein the bandwidth BW_B is allocated by averaging the values:
      BW__1*need-parameterB/need-parameter(A+B,
      BW__2*need-parameterB/need-parameter(B+C,
      BW_Total*need-parameterB/need-parameterA+B+C;
   where (i) BW_Total is the total bandwidth available for allocation, (ii) need-parameter (x) is the total bandwidth requirement of subgroup x, and (iii) BW_B is bounded by a minimum of BW__1+BW__2−BW_Total.

4. A statistical multiplexer in accordance with claim 3, wherein the bandwidths BW_A and BW_C are derived from the relationships:

$$BW\_A + BW\_B = BW\_1,$$

$$BW\_B + BW\_C = BW\_2, \text{ and}$$

$$BW\_A + BW\_B + BW\_C \leq BW\_\text{Total}.$$

* * * * *

UNITED STATES PATENT AND TRADEMARK OFFICE
CERTIFICATE OF CORRECTION

PATENT NO. : 7,450,609 B2  Page 1 of 1
APPLICATION NO. : 10/265080
DATED : November 11, 2008
INVENTOR(S) : Liu et al.

It is certified that error appears in the above-identified patent and that said Letters Patent is hereby corrected as shown below:

On the title page under the abstract "6 Drawing Sheets" should read --3 Drawing Sheets--

Figure 4:
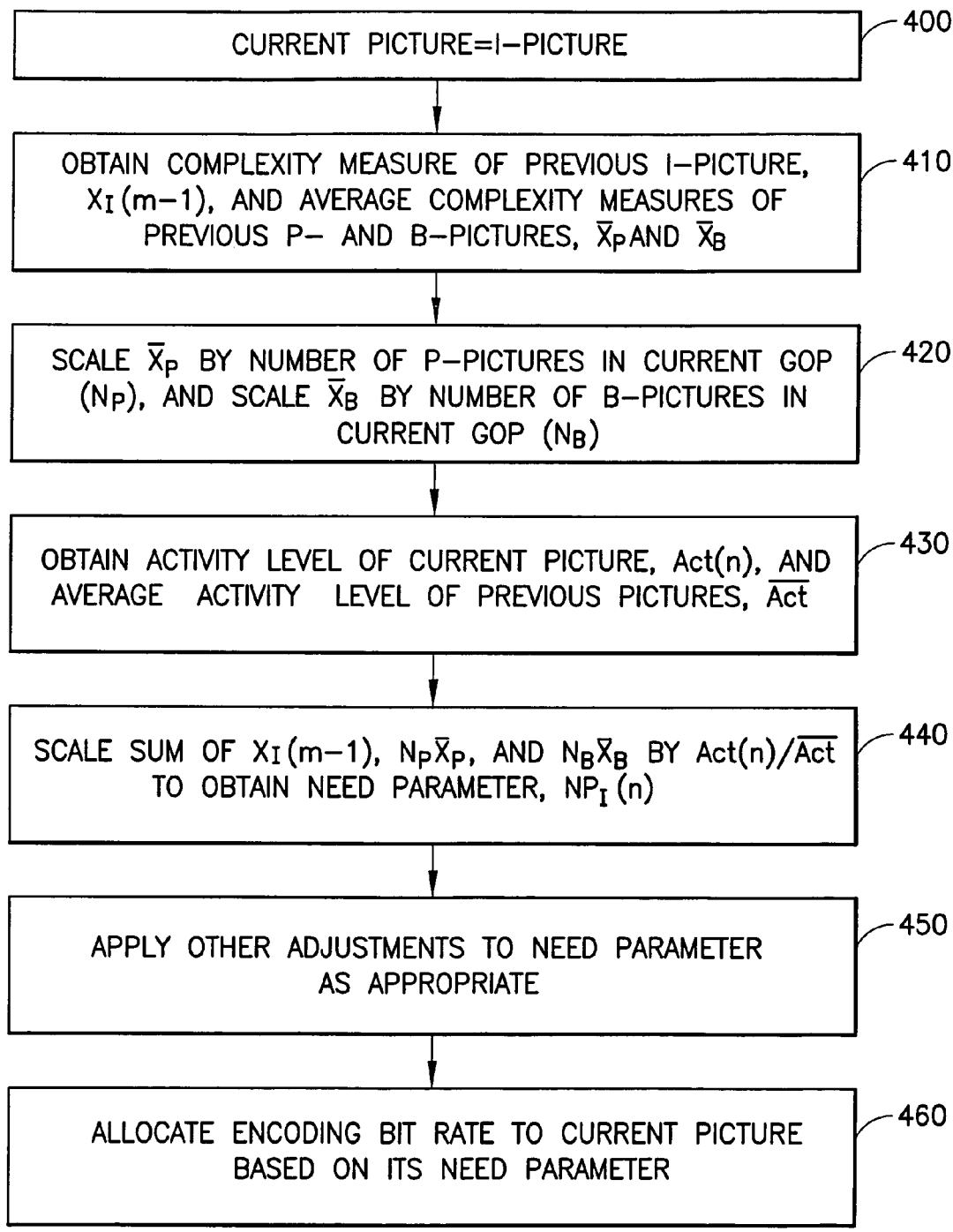
Figure 5:
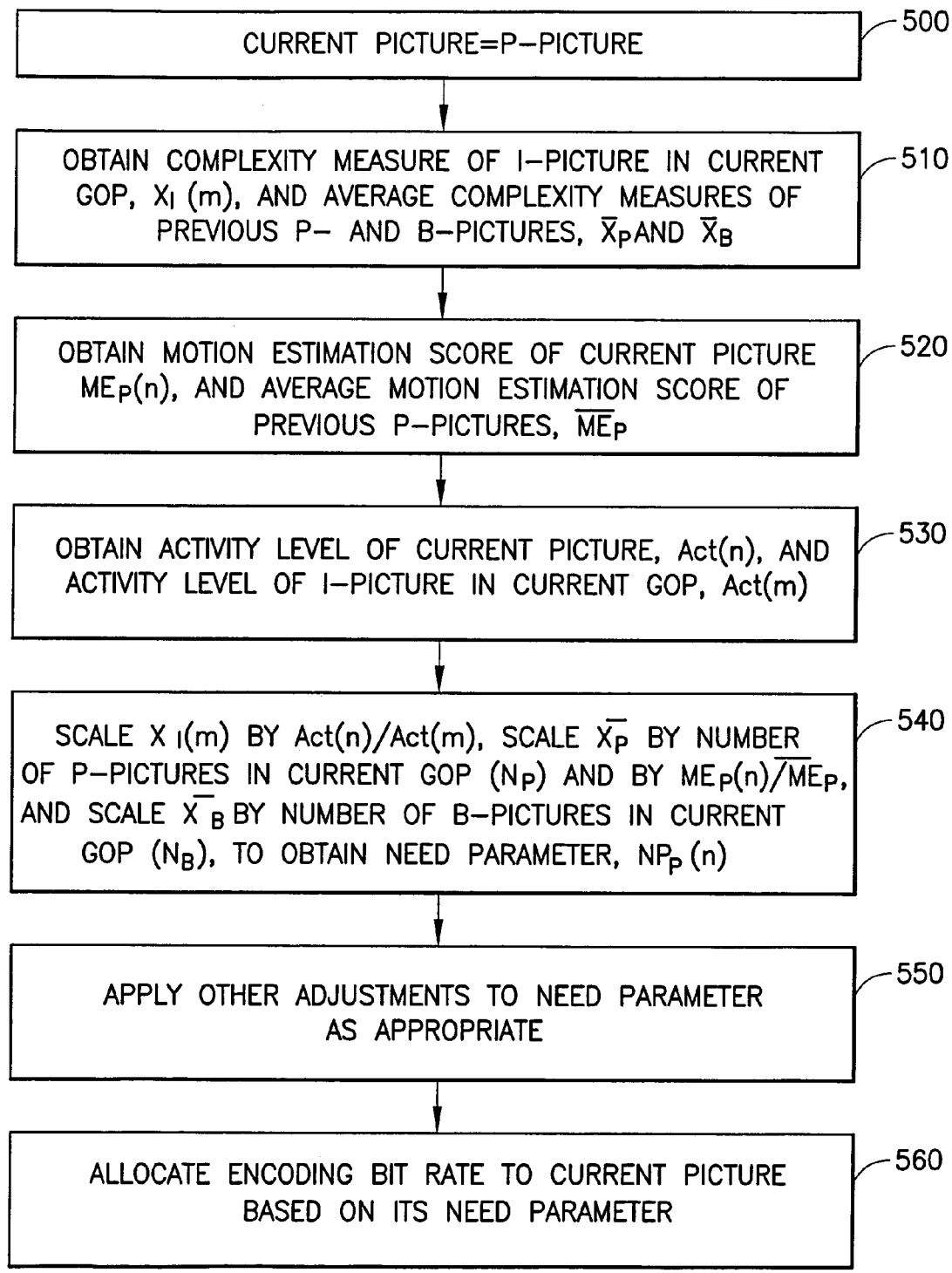
Figure 6:
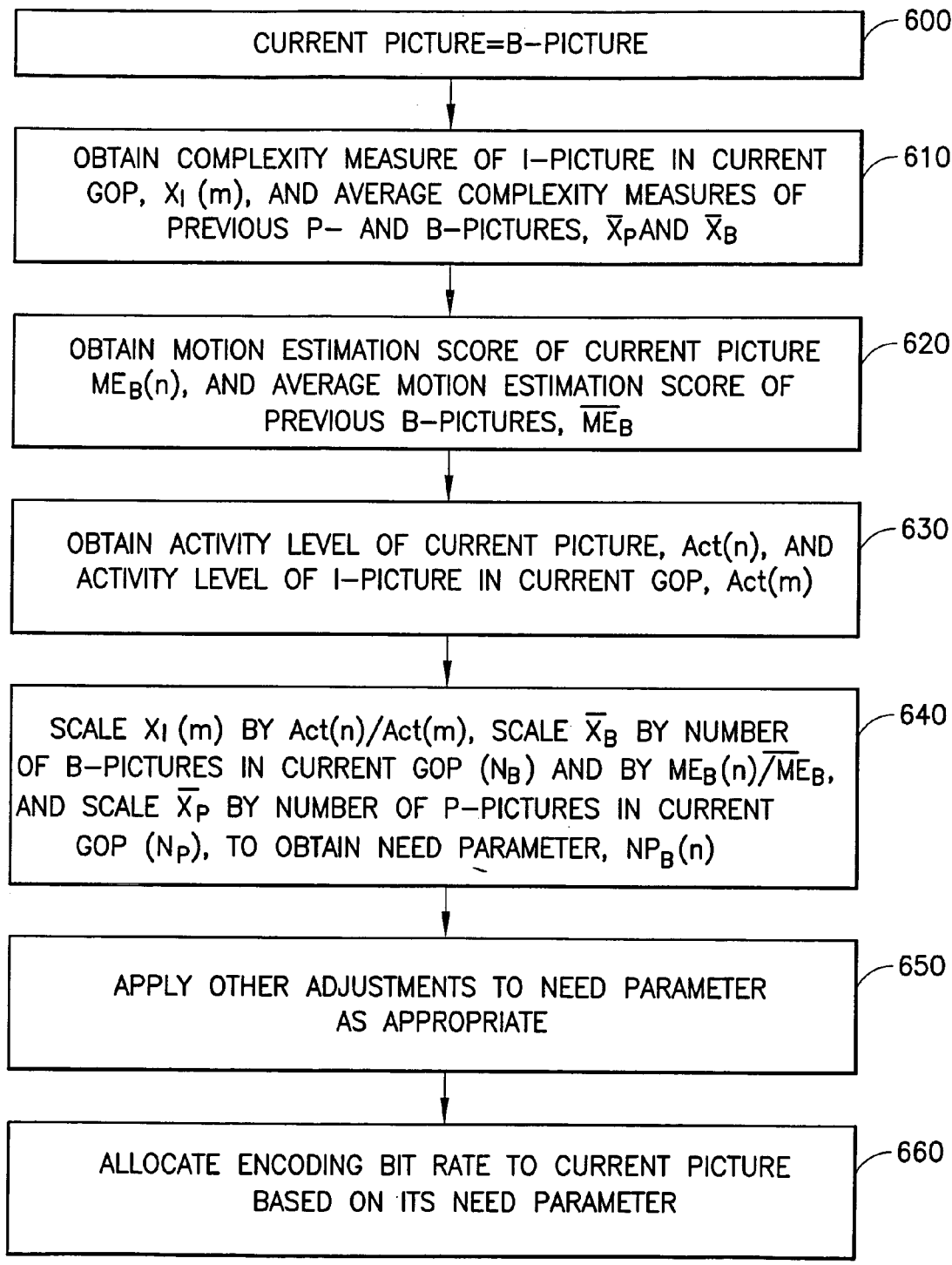

IN THE DRAWINGS:

--In the Drawings section of the issued patent, please delete Figs. 4 to 6.

IN THE CLAIMS:

--In Column 8, Line 12, in Claim 3, delete "(A+B" and insert --A+B--

--In Column 8, Line 13, in Claim 3, delete "(B+C" and insert --B+C--

Signed and Sealed this
Twenty-seventh Day of September, 2011

David J. Kappos
*Director of the United States Patent and Trademark Office*